(12) United States Patent
Gudnason et al.

(10) Patent No.: US 11,800,838 B2
(45) Date of Patent: Oct. 31, 2023

(54) REPLACEABLE KNIFE INSERT

(71) Applicant: Engineering Services Rotorua Limited, Rotorua (NZ)

(72) Inventors: Bjarni Gudnason, Rotorua (NZ); Tony Graeme Shrimpton, Rotorua (NZ)

(73) Assignee: Engineering Services Rotorua Ltd., Rotorua (NZ)

( * ) Notice: Subject to any disclaimer, the term of this patent is extended or adjusted under 35 U.S.C. 154(b) by 353 days.

(21) Appl. No.: 17/052,341

(22) PCT Filed: May 1, 2019

(86) PCT No.: PCT/NZ2019/050045
§ 371 (c)(1),
(2) Date: Nov. 2, 2020

(87) PCT Pub. No.: WO2019/212363
PCT Pub. Date: Nov. 7, 2019

(65) Prior Publication Data
US 2021/0169020 A1    Jun. 10, 2021

(30) Foreign Application Priority Data

May 2, 2018    (NZ) ........................................ 742153

(51) Int. Cl.
*A01G 23/095*    (2006.01)
*A01G 23/089*    (2006.01)

(52) U.S. Cl.
CPC ......... *A01G 23/095* (2013.01); *A01G 23/089* (2013.01)

(58) Field of Classification Search
CPC .. A01G 23/083; A01G 23/085; A01G 23/095; A01G 23/0955; A01G 23/097;
(Continued)

(56) References Cited

U.S. PATENT DOCUMENTS 3,826,295 A    7/1974    Johnson et al.
4,667,713 A *  5/1987    Wright .................. B23C 5/2265
                                                  144/241
(Continued)

FOREIGN PATENT DOCUMENTS

RU         2235456       10/2004
WO     WO2008145822      12/2008
WO     WO2014001629       1/2014

*Primary Examiner* — Matthew Katcoff
(74) *Attorney, Agent, or Firm* — Lowe Graham Jones, PLLC

(57) ABSTRACT

The invention relates to the mounting of knife inserts in apparatuses which require occasional or frequent replacement of the knife insert due to wear or damage of the knife, as is the case in delimbing machinery used in the forestry industry. The invention also relates to a knife carrier, a tree processing head, and to a method of installing a knife insert to a knife carrier. A knife insert for use with a knife carrier includes a blade portion, a retention portion configured to interface with a corresponding receiving portion of the knife carrier, and a force transmission means configured to introduce a preload from the knife carrier to the knife insert, wherein the preload is configured to force the retention portion against the receiving portion along a length of the blade portion and thereby removably hold the knife insert in place in the knife carrier.

19 Claims, 6 Drawing Sheets

Figure 1:
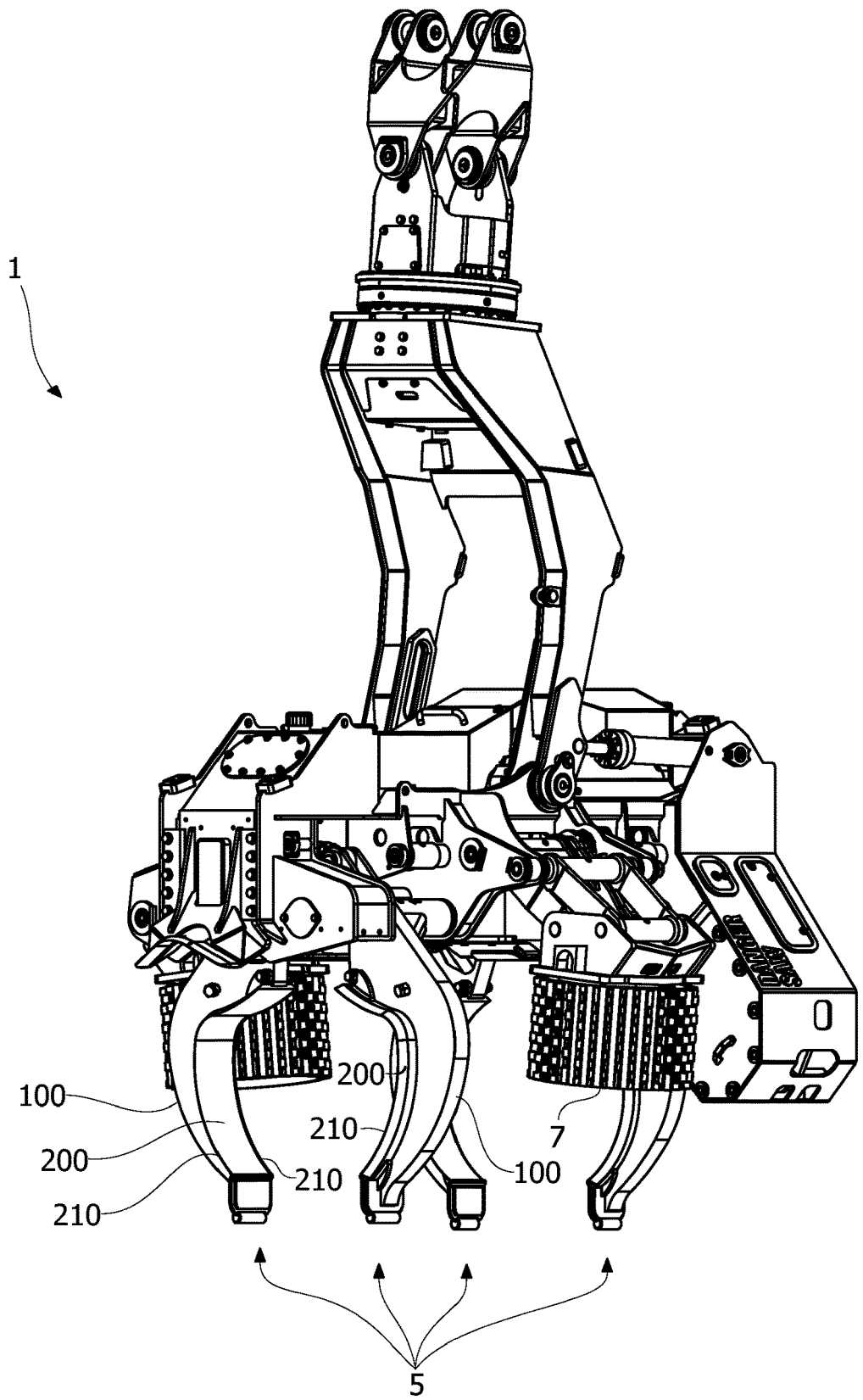

(58) Field of Classification Search
CPC .... B27L 1/00; B27L 1/005; B27L 1/06; B27L 1/08; B27L 1/10; B27G 13/00; B27G 13/02; B27G 13/04; B27G 13/08; B27G 13/10; B27G 13/12
See application file for complete search history.

(56) References Cited

U.S. PATENT DOCUMENTS

| | | | | |
|---|---|---|---|---|
| 4,709,737 | A * | 12/1987 | Jonsson | B27L 1/08 144/241 |
| 5,460,212 | A * | 10/1995 | Darden | B27L 1/08 144/241 |
| 6,244,312 | B1 * | 6/2001 | Hoffman | B27L 1/08 144/241 |
| 9,168,672 | B2 * | 10/2015 | Hinchliff | B27G 13/10 |
| 2012/0131977 | A1 | 5/2012 | Matt et al. | |

* cited by examiner

DETAIL A

DETAIL B

DETAIL C

DETAIL D

DETAIL A

DETAIL B

REPLACEABLE KNIFE INSERT

FIELD

This invention relates to the mounting of knife inserts in apparatuses which require occasional or frequent replacement of the knife insert due to wear or damage of the knife, as is the case in delimbing machinery used in the forestry industry.

BACKGROUND

In a variety of industrial applications, blades are used for cutting all kinds of material. Examples for such industrial applications can be found in the food and meat production industry, the building sector, and forestry industry.

These blades require regular or even frequent maintenance or replacement due to wear or damage induced during use.

In the forestry industry, an apparatus generally referred to as "tree harvester" is widely used, which allows for rapid cutting and delimbing of trees, wherein these two and potentially more functions are integrated in a so-called processing head.

In general, processing heads have delimb arms with knife carriers and knife inserts attached thereto, which as the name implies cut the limbs from the tree as the tree is rapidly drawn through the head with the aim of producing a clean stem. The delimb arms also serve as grappling arms to perform a variety of stem and log handling operations.

Due to the high processing speeds and resulting high impact forces on the cutting blades, knives of cutting heads are prone to wear, become dull and burred during use, and need regular replacement.

A common approach to address this need is to disassemble the whole affected delimbing arm from the chassis of the processor head and replace it with a refurbished arm, complete with a new knife insert. Another approach is to cut the knife insert from the carrier section of the arm and weld a replacement knife in place.

However, cutting blades for processing heads, just as any tailor-made blade in other industrial applications, are high-tech products, exhibiting special material properties such as refined steel grain structures and layer-wise construction to meet the industry's requirements in terms of toughness and wear resistance. As a consequence, the material poses high demands on the welding processes used and the personnel effecting it.

Another solution has been proposed in which the knife insert is bolted onto the delimb arm at densely distributed locations along the contour of the blade. However, due to the concentrated load introduction of the bolts, this solution requires the knife insert to have thick cross sections in the areas where the bolted connections are effected, resulting in a bulky and complex structure which tends to be considerably heavier than the delimb arms with welded blades. Moreover, while the bolted solution shortens the downtime of the machines used for exchanging blades when compared to the welded solution, loosening and tightening the large number of bolts typically required in this solution still takes more time than would be desirable.

Generally speaking, there is an ongoing need to replace knife inserts because of premature cracking as a result of the welding, along with normal wear and damage, which situation boosts maintenance costs and reduces overall production effectivity due to downtimes.

OBJECT OF THE INVENTION

It is therefore an object of the present invention to provide an assembly which overcomes or ameliorates at least one disadvantage of the prior art, or alternatively to provide the public with a useful choice.

Further objects of the invention will become apparent from the following description.

DISCLOSURE OF THE INVENTION

According to an aspect of the invention, there is provided a knife insert for use with a knife carrier, the knife insert comprising
  at least one blade portion;
  a retention portion configured to interface with a corresponding receiving portion of the knife carrier;
  a force transmission means configured to introduce a preload from the knife carrier to the knife insert, wherein the preload is configured to force the retention portion against the receiving portion along a length of the blade portion and thereby removably hold the knife insert in place in the knife carrier.

Preferably, the middle plane of the blade portion has an initial curvature along a length from a first end to a second end of the blade portion, wherein the initial curvature is preferably substantially arch shaped.

Preferably, the force transmission means is configured to introduce the preload into the blade portion such that the preload acts to alter the initial curvature of the blade portion.

Preferably, the retention portion is configured to allow for a predetermined alteration of the initial curvature of the blade portion at a maximum and to counteract any further alteration by resting on the receiving portion, such that the knife insert is firmly pre-stressed by the preload against the receiving portion.

Preferably, the blade portion substantially extends from a first end to a second end of the knife insert, wherein the force transmission means includes a first force transmission means at or near the first end and a second force transmission means at or near the second end.

Preferably, the force transmission means are configured to introduce the preload in a direction which is substantially parallel to the middle plane at or near the respective first and second end, respectively.

Preferably, the retention portion extends along and adjacent the blade portion.

Preferably, the retention portion is a groove in the knife insert which is configured to receive a corresponding key of the knife carrier.

Preferably, the retention portion is a key which protrudes from the knife insert and is configured to be received in a corresponding groove in the knife carrier.

Preferably, the first force transmission means is configured to introduce a compressive or a tensile force as the preload.

Preferably, the knife insert is made of cast steel.

In another aspect of the invention, there is provided a knife carrier for use with a knife insert, preferably a delimb arm for a tree processing head, the knife carrier comprising
  a receiving portion configured to receive a corresponding retention portion of the knife insert;
  force exertion means configured to exert a preload onto the knife insert, wherein the preload is configured to force the retention portion against the receiving portion along a length of the blade portion and thereby removably hold the knife insert in place in the knife carrier.

Preferably, the force exertion means includes a tensioner and a stop member.

Preferably, the tensioner is a rotary eccentric.

Preferably, the tensioner and the stop member are located near distal ends of the receiving portion.

Preferably, the receiving portion of the knife carrier has a shape that is substantially corresponding to an initial curvature of a blade portion of the knife insert, or has a slightly amplified curvature.

Preferably, the receiving portion is configured to allow for a predetermined alteration of the initial curvature of the blade portion at a maximum and to counteract any further alteration.

Preferably, the receiving portion is substantially formed as a key and is configured to receive a corresponding groove of the knife insert.

Preferably, the receiving portion is a groove and is configured to receive a corresponding key protruding from the knife insert.

In still another aspect of the invention, there is provided a system for mounting a blade to a machine or apparatus, the system including a knife insert and a knife carrier as defined in the foregoing.

In still another aspect of the invention, there is provided a tree processing head having at least one knife carrier as defined in the foregoing.

Preferably, the tree processing head includes furthermore a knife insert as defined in the foregoing.

In still another aspect of the invention, there is provided a method of installing a knife insert to a knife carrier, the knife insert comprising a retention portion and force transmission means, the knife carrier comprising a receiving portion and force exertion means, the method including the steps of engaging the retention portion of the knife insert and the receiving portion of the knife carrier;

engaging the force transmission means of the knife insert and the force exertion means of the knife carrier;

activating the force exertion means to force the retention portion against the receiving portion along a length of the blade portion and to exert a preload on the force transmission means and thus on a blade portion of the knife carrier;

locking the force exertion means to maintain the preload and to removably hold the knife insert in place in the knife carrier.

Preferably, the middle plane of the blade portion has an initial curvature along a length from a first end to a second end of the blade portion, wherein the initial curvature is preferably substantially arch shaped, and wherein the receiving portion of the knife carrier has a shape that is substantially corresponding to the curvature of the blade portion or has a slightly amplified curvature.

Preferably, the preload is introduced into the knife insert such that the preload acts to alter the initial curvature of the blade portion.

Preferably, the retention portion is configured to allow for a predetermined alteration of the initial curvature of the blade portion at a maximum, and to counteract any further alteration by resting on the retention portion, such that the knife insert is firmly pre-stressed by the preload against the receiving portion.

Preferably, the force exertion means includes a tensioner and a stop member.

Preferably, the tensioner is a rotary eccentric.

DRAWING DESCRIPTION

Figure 2:
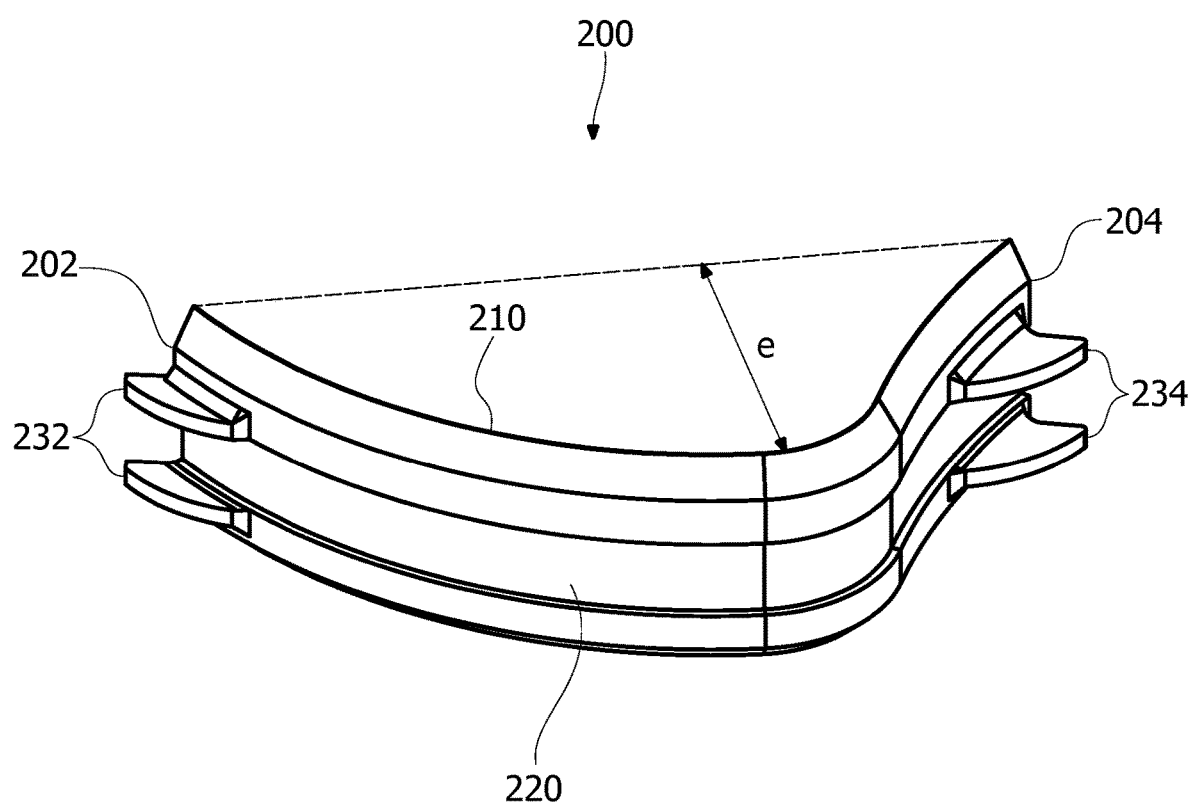

A number of embodiments of the invention will now be described by way of example with reference to the drawings in which FIG. 1 shows a spatial view of a processing head for harvesting and delimbing trees including a knife insert and a knife carrier according to an embodiment of the invention FIG. 2 shows a spatial view of the knife insert of FIG. 1

Figure 3:
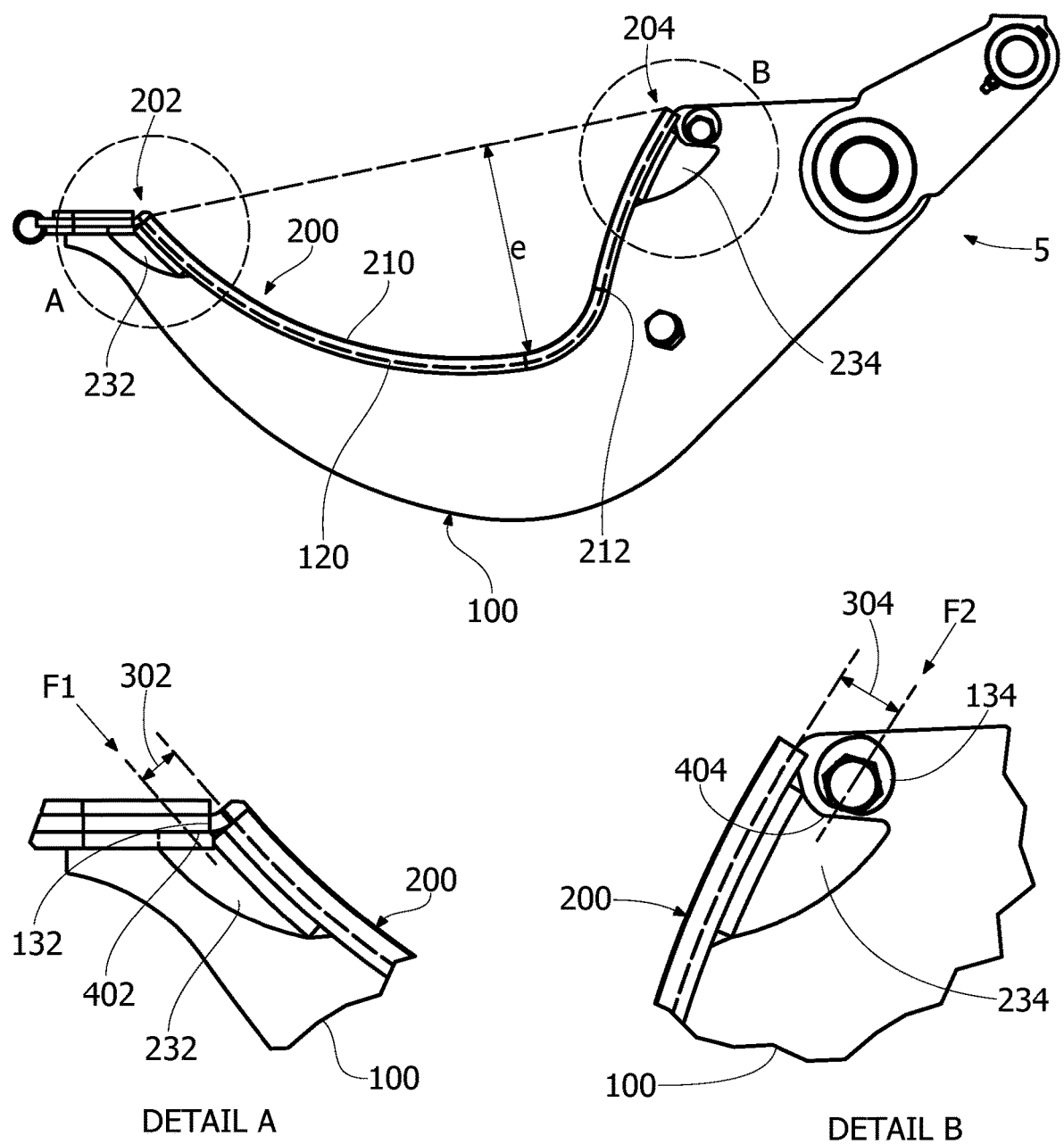
Figure 4:
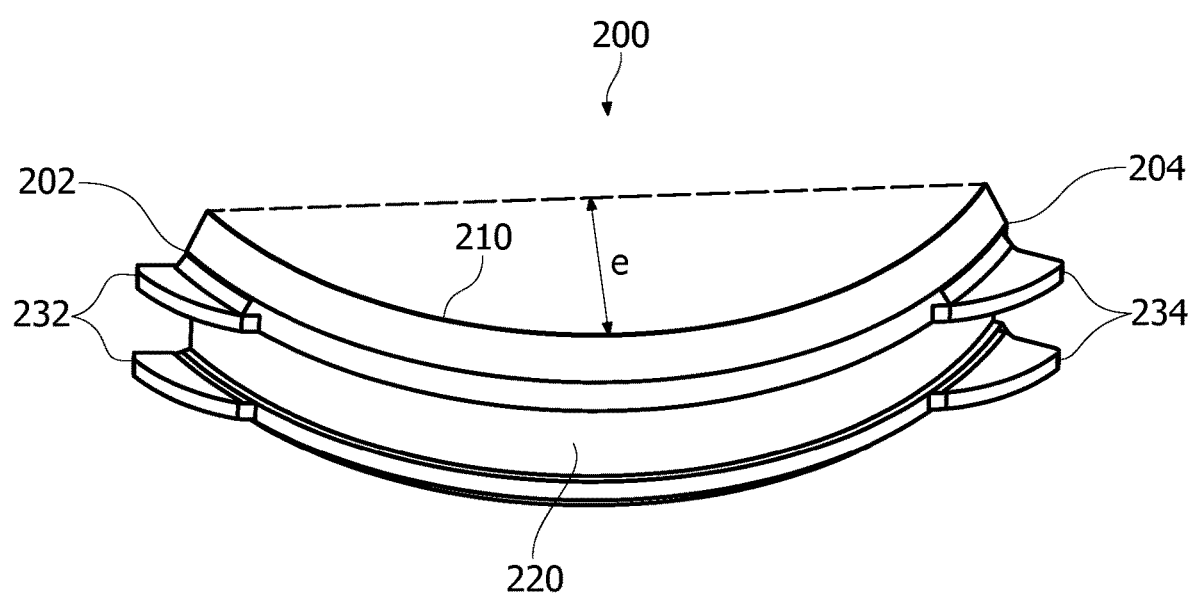
Figure 5:
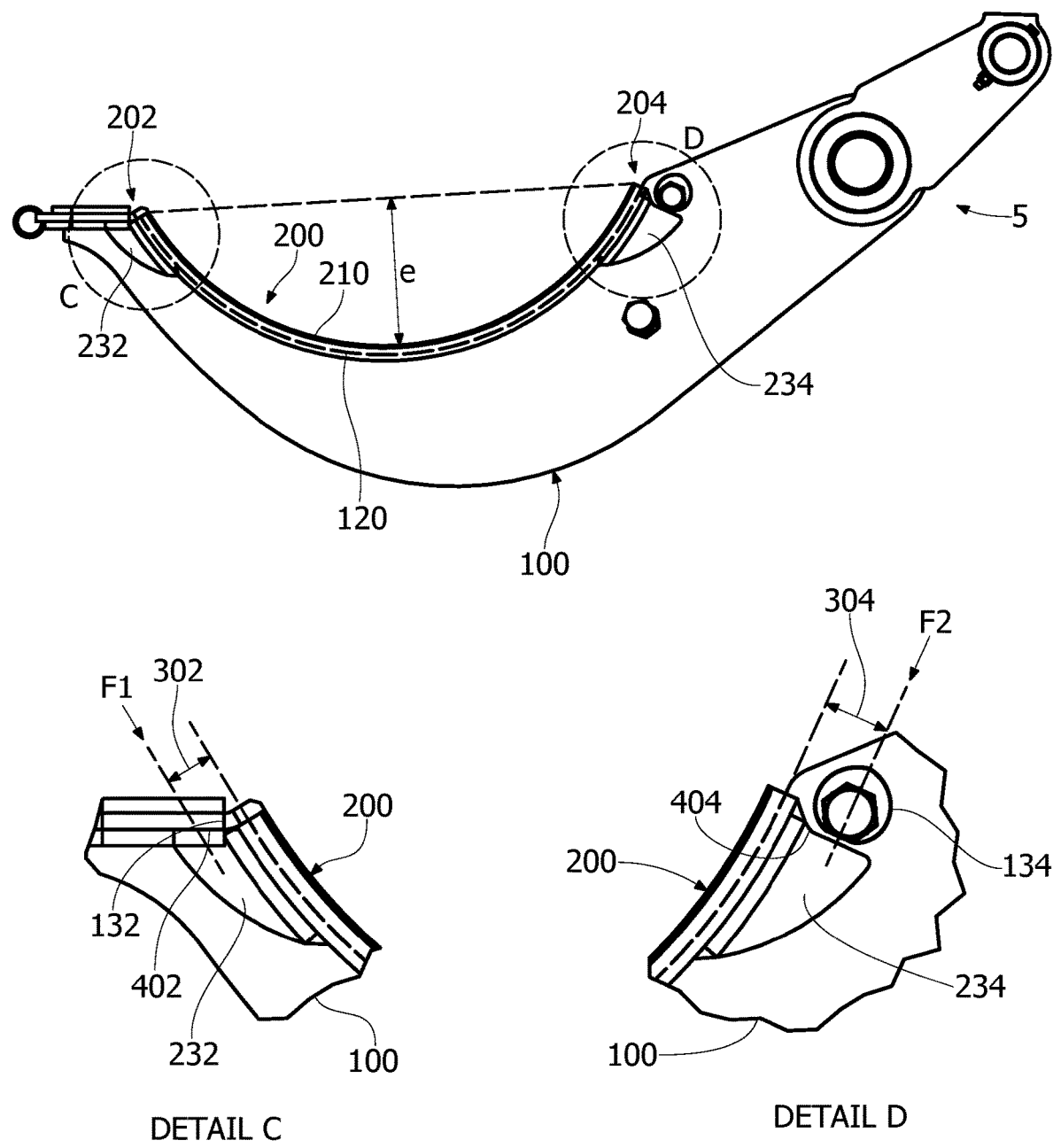
Figure 6:
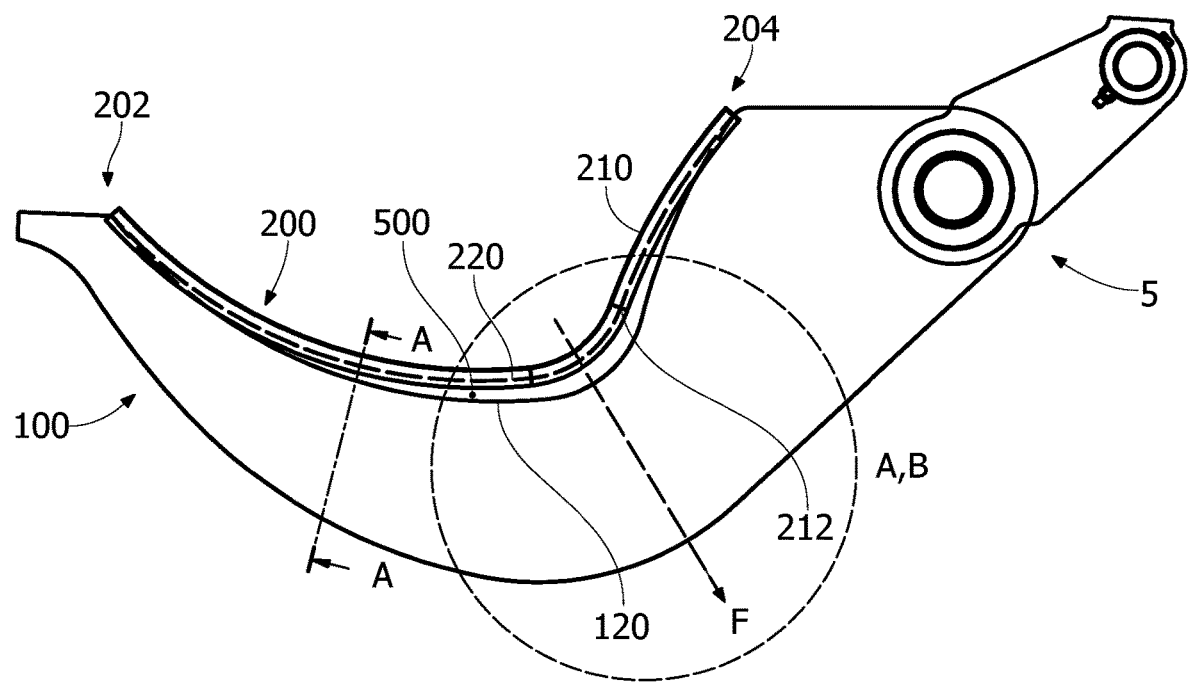
Figure 6:
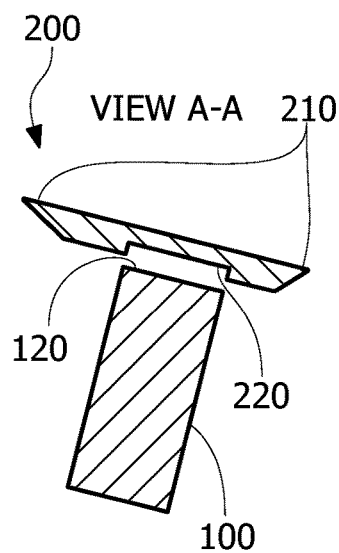
Figure 6:
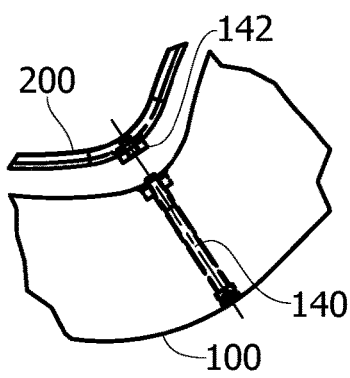
Figure 6:
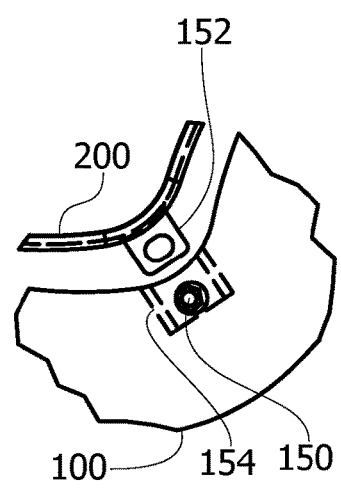

FIG. 3 shows a side view of the knife insert and the knife carrier of FIG. 1 as well as details of the end portions thereof FIG. 4 shows a spatial view of an alternative knife insert FIG. 5 shows a side view of the alternative knife insert of FIG. 4 and a corresponding alternative knife carrier, as well as details of the end portions thereof FIG. 6 shows a side view of yet another alternative knife insert and a corresponding alternative knife carrier, as well as details of two alternative mounting solutions

DETAILED DESCRIPTION

FIG. 1 shows a harvesting and processing head 1 of a tree harvester. Such processing heads 1 are commonly available as an attachment which can be installed to wheeled or tracked excavators modified for forestry applications or purpose built forestry machines. The harvesting and processing heads' 1 main functions are to fell standing trees, delimb the trees to produce clean stems and then cut each stem into logs.

The processing head 1 has two sets of corresponding delimb arms 5, an upper and lower set. Each set may have a different curvature arch shape so that when the four delimb arms 5 are wrapped around a tree, very good coverage of the tree's circumference is effected so that clean stems can be produced.

In other embodiments, the processing head 1 has only one set of delimb arms 5, i.e. two delimb arms 5, and there are also embodiments with three, five or more delimb arms 5.

To effect the delimbing, the processing head 1 includes a pair of rotary conveying means 7 configured to engage a trunk and pull it through and enable the delimb arms 5, the position of which will be adjusted to meet the diameter of the trunk, to cut off the limbs from the tree.

The delimb arms 5 each comprise a knife carrier 100 and a knife insert 200 mounted thereto.

The knife insert 200 of the depicted embodiment includes two opposing blade portions 210, which enable bi-directional processing of logs by the processing head 1, depending only on the direction from which the conveying means 7 pull the logs along the delimb arms 5. In other embodiments however, the knife insert 200 may only have one blade portion 210.

Turning to FIG. 2, the blade portions 210 extend from a first end 202 of the knife insert 200 to a second end 204 thereof, wherein a middle plane of the blade portions 200 has an initial unloaded curvature along a length of the blade portions 200 from the first end 202 to the second end. In the depicted embodiment, the initial curvature is substantially arch shaped, as indicated by double arrow e in FIG. 2, which arrow represents a depth in the curvature of the blade portion 210. Another characterisation of the initial curvature shown in FIGS. 2 and 3 is that the curvature is concave in view of the side facing away from the knife carrier 100. As will be appreciated by the representation of FIG. 3, the initial curvature of the blade portions 210 has a curvilinearity which exhibits, in a side view, an inflection point 212.

However, other shapes of the initial curvature are also envisaged, for example a sector of a circle, as is the case in the embodiment shown in FIGS. 4 and 5, or a substantially straight shape. In the embodiment depicted in FIGS. 4 and 5, like reference numerals were used for like features, and the explanations given in the foregoing apply to this embodiment as well. In an embodiment of a processing head 1 according to the invention, a first pair of delimb arms 5 is shaped according to the representation of FIGS. 2 and 3, while a second pair of delimb arms of the processing head 1 is formed as shown in FIGS. 4 and 5. This configuration has turned out to be particularly versatile in use.

The knife insert 200 furthermore includes a retention portion 220 configured to interface with a correspondingly shaped receiving portion 120 of the knife carrier 100. In the shown embodiment, the retention portion 220 extends substantially continuously along and adjacent the blade portions 210, wherein the retention portion 220 has the form of a groove in the knife insert 200 and extends between the two blade portions 210. As will be appreciated by the representation of FIGS. 3 and 4, the receiving portion 120 of the knife carrier 100 in these embodiments is configured as a key which continuously extends along the contour of the knife carrier 120. In other embodiments, the retention portion 220 of the knife insert 200 has the form of a key protruding from the knife insert 200 while the receiving portion 120 of the knife carrier 100 is substantially formed as a groove.

In some embodiments, the receiving portion 120 and/or the retention portion 220 may comprise complementary shoulders configured to support each other in the assembled state of the knife insert 200 and the knife carrier 100.

As shown in FIGS. 2 and 4, the knife insert 200 comprises a first force transmission means 232 at the first end 202 and a second force transmission means 234 at the second end 204, which together form a force transmission means configured to introduce a preload from the knife carrier 100 to the knife insert 200. To effect the preload, the knife carrier 100 includes corresponding force exertion means which can be locked once the force is applied, and which will be described in more detail further below.

In the depicted embodiments, the first 232 and second 234 force transmission means are formed as lugs or cams that exhibit a wedge-like shape and each have an undercut 402, 404 to accommodate the corresponding force exertion means of the knife carrier 100. Comparing the embodiment shown in FIG. 3B with the one shown in FIG. 5D, it will be appreciated that the undercut 404 is more pronounced in FIG. 3B than in FIG. 5D. This is due to the particular shape of the initial curvature of the blade portion 210 near the second end 204 in FIG. 3, where a component of a holding force is required that pulls the knife insert 200 flat against the knife carrier 100.

The first 232 and second 234 force transmission means can be welded, bonded, bolted or swaged to the retention portion 200 or to the blade portion 210, or attached thereto by means of form fit, e.g. by an arrangement of suitable keys and slots.

It should be mentioned that in some embodiments, the knife insert 200 is made of cast steel. Advantageously in these embodiments, the first 232 and second 234 force transmission means may be integrally cast with the first 202 and second end 204 of the knife insert 200. On top of that, the use of cast steel to manufacture the knife insert 200 has turned out to be beneficial in terms of reliability and wear resistance.

The first 232 and second 234 force transmission means are shaped such that the preload is introduced into the knife insert 200 in a plane distant from the blade portion 210 on the side of the knife carrier 100, as indicated in FIGS. 3 and 5 by eccentricities 302, 304. As a technical effect, this arrangement keeps the blade portion 210 clear of any parts that might in use turn out to be obstacles in the cutting process.

According to the invention, the preload is configured to removably hold the knife insert 200 in place in the knife carrier 100, thereby overcoming the need to weld the knife insert 200 onto the knife carrier 100. This setup eliminates or diminishes several drawbacks of prior art solutions, for example downtimes of the processing head 1 as well as undesired embrittlement, recrystallization, or warping of the blade portions 210 due to welding.

Contrary to state-of-the-art knife inserts with bolted connections along the contour of the blade as mentioned above, the preload interacts with the continuous retention portion 220 and receiving portion 120 to allow for a slender, consistent cross section of the blade insert 200 along the contour of the blade with improved handling in mounting and demounting. In addition, due to the continuous attachment of the knife insert 200 to the knife carrier 100 in the present invention, stress concentrations at local force introduction points are avoided, which turns out to be beneficial in terms of risks of material fatigue and brittle failure.

In an embodiment, the force transmission means is configured to introduce the preload into the knife insert 200 such that the preload acts to alter the initial curvature of the blade portion 210. This way, the blade portions 210 are pre-stressed and become more rigid to withstand forces aiming at a deformation of the blade portions 210 or the knife insert 200 in general, as will occur during operation of the processing head 1. As shown in the figures and to this end, the force transmission means (including the first force transmission means 232 and the second force transmission means 234) is configured to introduce the preload in a direction which is substantially parallel to the middle plane of the blade portions 210 at or near the respective first 202 and second end 204.

This feature is indicated in FIGS. 3 and 5 by force arrows F1 and F2, indicating directions of forces exerted by a tensioner 134 and a stop member 132, which are located near distal ends of the receiving portion 120 and which together form the force exertion means of the knife carrier 100. In one embodiment of the invention, the tensioner 134 is a rotary eccentric which is manually or automatically activated by simply rotating a screw or the like, as shown in the detailed views B and D of FIGS. 3 and 5, respectively. The skilled person will appreciate that components of the forces F1 and F2 interact with the initial depth e of the blade portion 210 to further open or stretch the curvature of the blade portions 210.

In this context, it is pointed out that the preload introduced into the blade portions 210 along force arrows F1 and F2 involves local bending moments caused by the first 232 and second 234 force transmission means and their corresponding eccentricities 302, 304 discussed above. By adjusting the eccentricities 302, 304 adequately in view of the curvature of the blade portion 210, a particularly tight fit between the knife insert 200 and the knife carrier 100 can be achieved.

The retention portion 220 of the knife insert 200 is configured to allow for a predetermined alteration of the initial curvature of the knife insert 200 at a maximum and to counteract any further alteration by resting on the receiving portion 120, such that the knife insert 200 is firmly pre-stressed by the preload against the receiving portion 120 of the knife carrier 100. This can be achieved, for example, by an adequate selection of the stiffness ratio between the knife insert 200 and the knife carrier 100. In an embodiment, the receiving portion 120 of the knife carrier 100 has a shape that has a slightly amplified curvature when compared to the curvature of the blade portion 210, which feature serves to allow for a small amount of deformation of the knife insert 200 during the introduction of the preload. The receiving portion 120 may be configured to allow for a predetermined alteration of the initial curvature of the blade portion 210 at a maximum and to counteract any further increase. This way, a snug fit between the knife insert 200 and the knife carrier 100 is achieved.

The skilled person will understand that the predetermined alteration of the initial curvature of the knife insert 200 may vary in terms of magnitude, inter alia depending on the stiffness of the parts involved. In cases where the knife insert 200 is relatively rigid, the predetermined alteration of the initial curvature may be relatively small, and may even lie within the range of the production tolerances of the knife insert 200, which means that during pre-stressing of the knife insert 200 against the receiving portion 120 of the knife carrier 100, these production tolerances are compensated for by deformation so that the knife insert 200 and the knife carrier 100 have a snug fit and the distribution of preload along the knife insert 200 is homogeneous.

In other cases, it might be desirable to allow for a bigger amount of alteration of the initial curvature in order to achieve a higher level of pre-stress in the knife insert 200 and the blade portion 210. In these cases, it might be possible to identify an initial gap between the knife insert 200 and the knife carrier 100 with the naked eye before the preload is applied. In this way, compressive pre-stressing may be achieved in parts of the knife insert 200 that are subject to cyclic loading. As the skilled person will appreciate, compressive pre-stressing reduces the level of tensile stresses in use and can turn out to be beneficial for the fatigue resistance of the assembly.

In another embodiment, one or both of the force transmission means are configured as force exertion means, e.g. as rotary eccentrics, while the force exertion means are configured to provide reaction forces only. In this case, when inserting the knife insert 200 into the knife carrier 100, an operator would activate and subsequently lock the rotary eccentric at the knife insert 200 to apply the preload to the blade portion 200.

While the figures show an embodiment in which the preload induces a compressive force and a bending moment into the blade portions 210, embodiments are envisaged in which the preload is a tensile force or a tensile force combined with a bending moment. Such embodiments encompass knife inserts 200 the blade portion 210 of which exhibit a curvature which is convex in view of the side facing away from the knife carrier 100. In these cases, a tensile preload induced at the first 202 and second 204 end pulls the blade portion 210 onto the correspondingly shaped receiving portion 120 of the knife carrier 100 and thus effects the blade portion's 210 desired resistance to deformation and removable attachment to the knife carrier 100.

In the embodiments shown in FIGS. 2-5, the force exertion means includes basically two spatially separate parts, namely the stop member 132 and the tensioner 134. Similarly, the force transmission means has been described as including two separate parts, namely the first 232 and second 234 force transmission means. In other embodiments however, as shown in FIG. 6, the force exertion means and force transmission means each comprise one compact subassembly that interact to exert a preload on the knife insert 100 at a central portion thereof and to thus fix it onto the knife carrier 200.

In the embodiment depicted in FIG. 6, like reference numerals were used for like features, and the explanations given in the foregoing apply to this embodiment as well. As mentioned, contrary to the embodiments described in the foregoing, the force exertion means the force transmission means each include one compact subassembly, which feature is generally represented by arrow F, indicating a direction of force along which the preload can be introduced into the knife insert 200.

As can be seen in the Figure, the knife insert 200 and the knife carrier 100 each exhibit an initial curvature, with an initial gap 500 between the knife insert 200 and the knife carrier 100 resulting from a difference in initial curvature between these parts. It will be appreciated by the skilled person that the amplitude of the initial gap 500 is not to scale in the Figure but is exaggerated, and reference is made to the explanations made in the foregoing.

Detail A-A in FIG. 6 shows a cross-sectional view of the knife insert 200 and the knife carrier 100 before the initial gap 500 is closed. In this embodiment, the retention portion 220 of the knife insert 200 is a notch and the receiving portion 120 of the knife carrier 100 is formed by a mating surface thereof. When the knife insert 200 is fixed to the knife carrier 100 by exertion of a clamping force along arrow F, the initial gap 500 will close and the knife insert 200 will be snugly attached to the knife carrier 100 by interaction of the retention portion 220 and the receiving portion 120 as described above.

Details regarding the exertion of this clamping force will be now be described.

As shown in detail A of FIG. 6, the force exertion means a threaded bolt 140 inserted in a corresponding hole in the knife carrier 100. The threaded bolt 140 interacts with a nut 142 attached to or integrally formed in the knife insert 200. Hence, in this embodiment, the nut 142 corresponds to the force transmission means. In order to introduce the preload into the knife insert 200, the threaded bolt 140 engages the nut 142 and is tightened to pull the knife insert 200 towards the knife carrier 100 until the initial gap 500 closes under the effect of the preload and the retention portion 220 and receiving portion 120 mate.

In detail B of FIG. 6, the force transmission means is designed as a lug 152 having a bore in it, which lug 152 can be received by a corresponding clearance 154 in the knife carrier 100. An eccentric 150 inserted in a bore in the knife carrier 100 which also extends through the bore of the lug 152 in a mounted state forms the force exertion means. When the eccentric 150 engages the bore of the lug 152 and is tightened by a bolt head or the like as indicated in the figure, the initial gap 500 closes under the effect of the preload and the retention portion 220 and receiving portion 120 mate.

As is apparent from the foregoing, the knife carrier 100 and the knife insert 200 together form a system for mounting a blade to a machine or apparatus. While this system has been described in context with a processing head 1 of a tree harvester, it can be applied in other technical fields as well, for example in the food and meat industry or in apparatuses for carving wood.

We claim:

1. A knife carrier for use with a knife insert, the knife carrier comprising:
   a receiving portion configured to receive a corresponding retention portion of the knife insert, and
   force exertion means configured to exert a preload onto the knife insert, wherein the preload is configured to force the retention portion against the receiving portion along a length of a blade portion of the knife insert and thereby removably hold the knife insert in place in the knife carrier;
   wherein the force exertion means includes a tensioner and a stop member; and
   wherein the tensioner is a rotary eccentric.

2. The knife carrier according to claim 1, wherein the tensioner and the stop member are located near distal ends of the receiving portion.

3. The knife carrier according to claim 1, wherein the receiving portion of the knife carrier has a shape that is substantially corresponding to an initial curvature of the blade portion of the knife insert, or has a slightly amplified curvature.

4. The knife carrier according to claim 1, wherein the receiving portion is substantially formed as a key and is configured to receive a corresponding groove of the knife insert.

5. The knife carrier according to claim 1, wherein the receiving portion is a groove and is configured to receive a corresponding key protruding from the knife insert.

6. A knife carrier for use with a knife insert, the knife carrier comprising:
   a receiving portion configured to receive a corresponding retention portion of the knife insert; and
   force exertion means configured to exert a preload onto the knife insert, wherein the preload is configured to force the retention portion against the receiving portion along a length of a blade portion of the knife insert and thereby removably hold the knife insert in place in the knife carrier,
   wherein the receiving portion is configured to allow for a predetermined alteration of an initial curvature of the blade portion at a maximum and to counteract any further alteration.

7. A knife insert for use with a knife carrier, the knife insert comprising:
   at least one blade portion;
   a retention portion configured to interface with a corresponding receiving portion of the knife carrier; and
   a force transmission means configured to introduce a preload from the knife carrier to the knife insert, wherein the preload is configured to force the retention portion against the receiving portion along a length of the blade portion and thereby removably hold the knife insert in place in the knife carrier;
   wherein the force transmission means is configured to introduce the preload into the blade portion such that the preload acts to alter an initial curvature of the blade portion.

8. The knife insert according to claim 7, wherein the retention portion is configured to allow for a predetermined alteration of the initial curvature of the blade portion at a maximum and to counteract any further alteration by resting on the receiving portion, such that the knife insert is firmly pre-stressed by the preload against the receiving portion.

9. The knife insert according to claim 7, wherein a middle plane of the blade portion has an initial curvature along a length from a first end to a second end of the blade portion.

10. The knife insert according to claim 7, wherein the retention portion extends along and adjacent the blade portion.

11. The knife insert according to claim 7, wherein the retention portion is a groove in the knife insert which is configured to receive a corresponding key of the knife carrier.

12. The knife insert according to claim 7, wherein the retention portion is a key which protrudes from the tree processing head knife insert and is configured to be received in a corresponding groove in the knife carrier.

13. The knife insert according to claim 7, wherein the force transmission means is configured to introduce a compressive or a tensile force as the preload.

14. A knife insert for use with a knife carrier, the knife insert comprising:
   at least one blade portion;
   a retention portion configured to interface with a corresponding receiving portion of the knife carrier; and
   a force transmission means configured to introduce a preload from the knife carrier to the knife insert, wherein the preload is configured to force the retention portion against the receiving portion along a length of the blade portion and thereby removably hold the knife insert in place in the knife carrier;
   wherein the blade portion substantially extends from a first end to a second end of the knife insert and wherein the force transmission means includes a first force transmission means at or near the first end and a second force transmission means at or near the second end.

15. The knife insert according to claim 14, wherein the force transmission means are configured to introduce the preload in a direction which is substantially parallel to a middle plane of the blade portion at or near the respective first and second end, respectively.

16. A method of installing a knife insert to a knife carrier, the knife insert comprising a retention portion and force transmission means, the knife carrier comprising a receiving portion and force exertion means, the method including the steps of:
   engaging the retention portion of the knife insert and the receiving portion of the knife carrier;
   engaging the force transmission means of the knife insert and the force exertion means of the knife carrier;
   activating the force exertion means to force the retention portion against the receiving portion along a length of a blade portion of the knife insert and to exert a preload on the force transmission means and thus on the blade portion of the knife insert; and
   locking the force exertion means to maintain the preload and to removably hold the knife insert in place in the knife carrier;
   wherein the preload is introduced into the knife insert such that the preload acts to alter an initial curvature of the blade portion.

17. The method according to claim 16, wherein the retention portion is configured to allow for a predetermined alteration of the initial curvature of the blade portion at a maximum, and to counteract any further alteration by resting on the retention portion, such that the knife insert is firmly pre-stressed by the preload against the receiving portion.

18. The method according to claim 16, wherein a middle plane of the blade portion has an initial curvature along a length from a first end to a second end of the blade portion, and wherein the receiving portion of the knife carrier has a shape that is substantially corresponding to the curvature of the blade portion or has a slightly amplified curvature.

19. A method of installing a knife insert to a knife carrier, the knife insert comprising a retention portion and force transmission means, the knife carrier comprising a receiving portion and force exertion means, the method including the steps of:
- engaging the retention portion of the knife insert and the receiving portion of the knife carrier;
- engaging the force transmission means of the knife insert and the force exertion means of the knife carrier;
- activating the force exertion means to force the retention portion against the receiving portion along a length of a blade portion of the knife insert and to exert a preload on the force transmission means and thus on the blade portion of the knife insert; and
- locking the force exertion means to maintain the preload and to removably hold the knife insert in place in the knife carrier;
- wherein the force exertion means includes a tensioner and a stop member; and
- wherein the tensioner is a rotary eccentric.

* * * * *